Inventors:
Louis F. Blume,
Guglielmo Camilli,
by Charles E. Muller
Their Attorney.

Patented July 4, 1933

1,917,087

UNITED STATES PATENT OFFICE

LOUIS F. BLUME AND GUGLIELMO CAMILLI, OF PITTSFIELD, MASSACHUSETTS, ASSIGNORS TO GENERAL ELECTRIC COMPANY, A CORPORATION OF NEW YORK

PROTECTIVE DEVICE FOR ELECTRICAL APPARATUS

Application filed March 19, 1928. Serial No. 262,785.

Our invention relates to protective devices for electrical apparatus. A fault in electrical apparatus is usually the result of a failure of the insulation. This may be due to defective insulation, to abnormal temperature or voltage conditions or to other causes. Failure of the insulation is accompanied by and may be caused by electrical disturbances such as corona, arcing and creepage of current along the surface of the insulation. These electrical disturbances cause vibrations, noises and sounds which are of different character from those incident to the normal operation of the apparatus and it is the general object of the invention to provide protective means operative in response to such vibrations and sounds.

Figure 1:
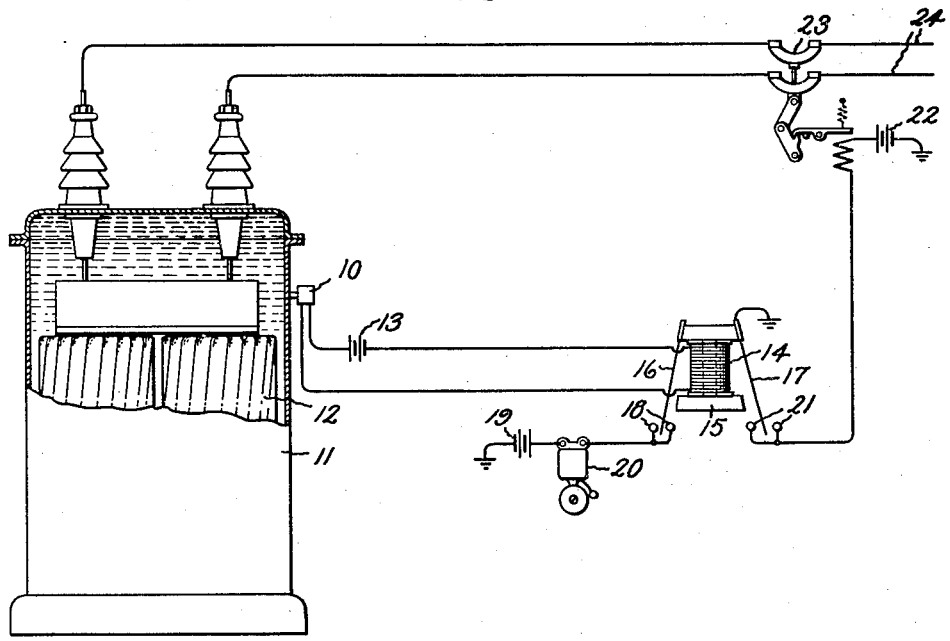
Figure 2:
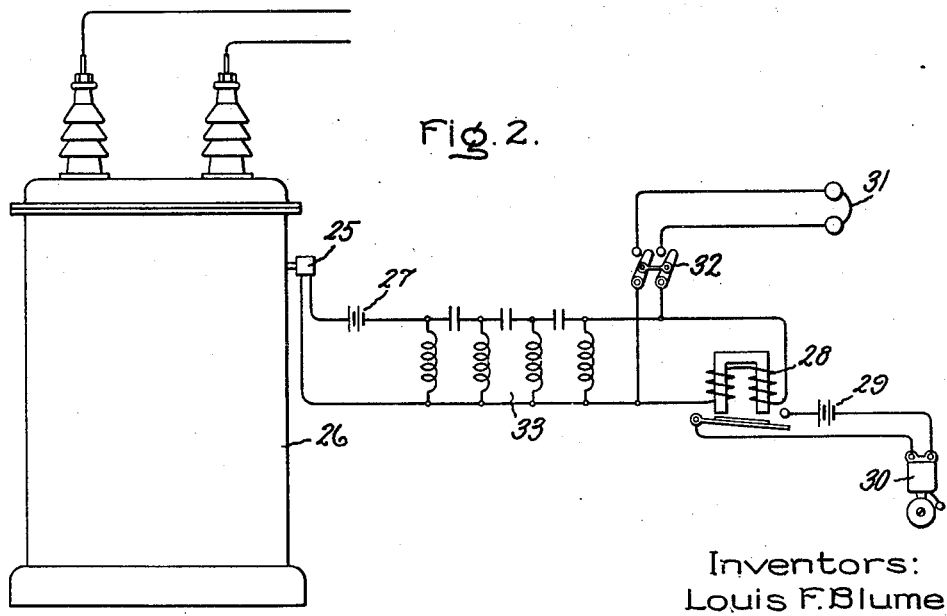

The invention will be better understood and further objects and advantages will appear in the following description taken in connection with the accompanying drawing in which Fig. 1 shows an encased oil immersed transformer provided with a fault detector arranged in accordance with the invention and Fig. 2 shows a similar transformer provided with another form of detector arranged in accordance with the invention.

In the arrangement shown in Fig. 1, a sound and vibration responsive device 10, such as a microphone, is secured to the casing 11 of an encased oil immersed transformer 12. Thus the device 10 will respond to any sounds and vibrations originating within and transmitted to the casing 11. The device 10 is connected in circuit with a battery 13 and the energizing coil 14 of an electro-magnet 15 which will pulsate at a frequency corresponding to that of any sounds and vibrations reaching the device 10.

The sounds and vibrations reaching the device 10 and therefore affecting the current in the coil 14 will of course include those caused by the normal operation of the transformer 12 as well as those which may be due to electrical disturbances such as corona, arcing and the like. These normal sounds and vibrations are mostly of low frequency, however, as compared with those due to electrical disturbances. The electromagnet 15 is provided with two vibratory members 16 and 17 which are designed or tuned to vibrate more readily at the high frequencies corresponding to those of electrical disturbances in the transformer than at low frequencies corresponding to those due to the normal operation of the transformer. The members 16 and 17 will not be appreciably affected under normal operation of the transformer but they will vibrate in response to electrical disturbances in the transformer.

A definite small amplitude of vibration of the member 16 will cause it to touch one or both of a pair of contacts 18 and close a circuit through a battery 19 and bell 20 and the ringing of the bell will indicate an electrical disturbance and therefore a fault in the transformer 12. A definite amplitude of vibration of the member 17 in response to electrical disturbances in the transformer will cause the member 17 to touch one or both of a pair of contacts 21 and close a circuit through a battery 22 and the tripping coil of a switch 23 in the circuit 24 connected to the terminals of the transformer 12. This will disconnect the transformer from the circuit 24 and prevent further damage to the transformer.

The contacts 21 are spaced further from the member 17 than are the contacts 18 from the member 16. Thus, a greater electrical disturbance in the transformer is necessary to actuate the switch 23 than is necessary to ring the bell 20. A signal by the bell therefore will indicate a slight disturbance in the transformer and the transformer will be disconnected if the disturbance becomes more serious and before it can do great damage.

In the arrangement shown in Fig. 2, a sound and vibration responsive device 25 is secured to the casing 26 of an encased oil immersed transformer so that this device 25 will respond to sounds and vibrations originating within and transmitted to the casing 26. The device 25 is connected in circuit with a battery 27 and the energizing coil of a relay 28. When this relay is energized, its contacts close a protective circuit which is shown as including a battery 29 and a bell 30. A sensitive protective device shown as a telephone receiver 31 may also be connected by a switch 32 to the battery 27 and the device 25.

In order to prevent operations of the protective devices 30 and 31 in response to the normal sounds and vibrations of the transformer, an electrical filter 33 is connected into the circuit between the device 25 and the protective devices 30 and 31. This filter 33 may be of any well known form which will prevent passage of currents having low frequencies corresponding to those of the sounds and vibrations due to normal operation of the transformer but which will allow the passage of currents having high frequencies corresponding to those caused by electrical disturbances in the transformer. It has been found that in some cases a filter will be satisfactory for this purpose which will stop currents having frequencies below about two thousands cycles per second and allow the passage of current having frequencies higher than this. In this arrangement, a very sensitive device such as the telephone receiver 31 will indicate small electrical disturbances in the transformer and a less sensitive means such as the relay 28 with its signal bell 30 will indicate more serious disturbances such that prompt manual disconnection of the transformer from any circuits to which it is connected may be desirable.

While the invention has been explained by describing and illustrating different forms thereof, it will be apparent that various changes and applications may be made without departing from the scope of the invention as defined in the appended claims.

What we claim as new and desire to secure by Letters Patent of the United States, is:

1. The combination with high voltage electrical induction apparatus, of means responsive to sounds produced by abnormal electrical disturbances in said apparatus, a protective device, and means controlled by said sound responsive means for actuating said protective device, said actuating means being tuned to actuate said protective device only when the frequency of the sound is of the order of at least two thousand cycles per second.

2. The combination with high voltage electrical induction apparatus, of means responsive to sounds produced by abnormal electrical disturbances in said apparatus, two protective devices, and means controlled by said sound responsive means for actuating said protective devices, said actuating means being tuned to actuate said protective devices only when the frequency of the sound is of the order of at least two thousand cycles per second, and said protective devices being unequally sensitive.

3. The combination with high voltage electrical induction apparatus, of means responsive to sounds having frequencies at least of the order of two thousand cycles per second produced by abnormal electrical disturbances in said apparatus, a protective device, and means for transmitting the effect of high frequency sounds from said sound responsive means to actuate said protective device, said transmitting means being tuned to prevent the transmission of the effects of sounds having substantially lower frequencies.

4. The combination with high voltage electrical induction apparatus, of means responsive to sounds having frequencies at least of the order of two thousand cycles per second produced by abnormal electrical disturbances in said apparatus, a protective device, and means for transmitting the effect of said high frequency sounds due to electrical disturbances in said apparatus from said sound responsive means to actuate said protective device, said transmitting means being tuned to prevent the transmission of the effects of sounds having substantially lower frequencies.

5. The combination with high voltage electrical induction apparatus, of means responsive to sounds having frequencies at least of the order of two thousand cycles per second produced by abnormal electrical disturbances in said apparatus, a protective device, and means for transmitting the effect of sounds from said sound responsive means to actuate said protective device, said transmitting means being tuned to transmit the effect of sounds having frequencies at least of the order of two thousand cycles per second more readily than the effect of sound having substantially lower frequencies.

In witness whereof, we have hereunto respectively set our hands this 10th day of March, 1928, and this 14th day of March, 1928.

LOUIS F. BLUME.
GUGLIELMO CAMILLI.